United States Patent

[11] 3,549,002

| [72] | Inventor | John M. Leach |
| | | P.O. Box 341, Port Jefferson, N.Y. 11777 |
| [21] | Appl. No. | 747,151 |
| [22] | Filed | July 24, 1968 |
| [45] | Patented | Dec. 22, 1970 |
| | | Continuation-in-part of Ser. No. 726,381, May 3, 1968, now Pat. No. 3,451,527, dated June 24, 1969 |

[54] ARTICLE CONVEYORS
10 Claims, 1 Drawing Fig.
[52] U.S. Cl. ................................................. 198/127, 198/34
[51] Int. Cl. ..................................................... B65g 13/02
[50] Field of Search ............................................ 198/34, 127, 160

[56] References Cited
UNITED STATES PATENTS
3,122,232  2/1964  Burt ............................ 198/127

*Primary Examiner*—Edward A. Sroka

ABSTRACT: This invention relates to power driven article conveyors of the type commonly known as accumulation conveyors. In the operation of such type conveyor, whenever an article is stopped thereon for any reason, suitable mechanism is operated to stop the forward movement of the next article behind the stopped article in the direction of article flow just before or just after it touches the stopped article ahead, and this action is continued along down the line of approaching articles so as to prevent the articles from forcibly crowding together sufficiently to damage each other or make them difficult to remove from the line.

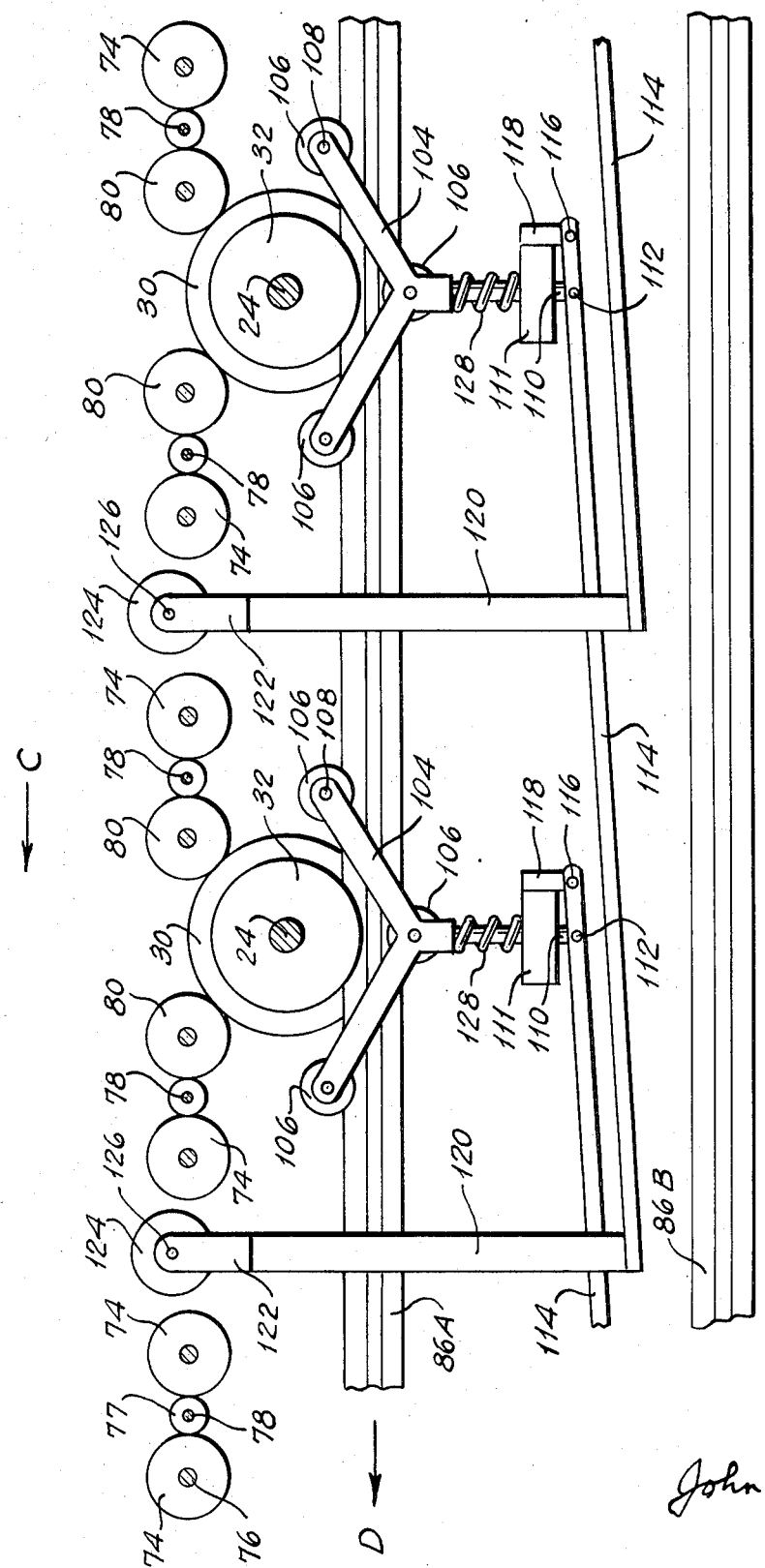

ARTICLE CONVEYORS

This application is a continuation in part of application Ser. No. 726,381; filed May 3, 1968 now U.S. Pat. No. 3,451,527 issued June 24, 1969. All of the objects set forth in that application apply with equal force to this invention.

It is also an object of the present invention to provide an accumulation-type conveyor wherein the stopping operation of an article behind a stopped article is instantaneous.

It is another object of the present invention to provide on accumulation-type conveyor in which the starting operation of a stopped article is instantaneous upon the removal or movement of an article ahead of it.

It is a further object of the present invention to provide an accumulation-type conveyor in which the stopping or starting operation for a given article is limited to the given article and is not even slightly transmitted to any other article.

Other objects and advantages of the present invention will become apparent to those skilled in the art upon recourse to the following specification and drawing in which the FIG. is in a fragmentary side elevational view of one type of article conveyor constructed in accordance with the present invention with the frame elements and powered drive omitted in order to show the features of the present invention more clearly as the omitted elements within themselves form no part of the present invention.

The present invention is described in this application as being applied to a roller-type conveyor but it is to be understood that it can with equal facility be applied to a skate wheel type of conveyor exactly in the same way as described in the above-identified application.

What is now considered the preferred embodiment of the present invention comprises accumulation-type conveyor comprising rollers 74 suitably journaled on shafts 76 which are suitably mounted in conventional frame members not shown.

At any desired intervals each of a pair of rollers 80 –80 are frictionally driven by a wheel 30 preferably provided with some suitable friction surface. Each wheel 30 is mounted on a shaft 24 for rotation therewith. A V-pulley 32 is also mounted on each shaft 64 for rotation therewith. Each shaft 24 is suitably journaled in bearings carried by the frame.

Each of the driven rollers 80 drives an adjacent roller 74 by means of a friction wheel 77 journaled for rotation on a shaft 78 carried by the frame. Each driven roller 74 can likewise drive the next roller 74 by means of such a friction wheel where desired.

Each of the V-pulleys 32 is driven at desired times by a run 86A of a double V-belt of known type. The V-belt is carried at one end by a sheave (not shown) which is suitably power driven and at the other end by a takeup sheave (not shown) and the return run of the V-belt is shown at 86B.

A belt controlling mechanism is mounted adjacent to each V-pulley 32 and comprises a Y-shaped member 104 which carries three sheaves 106 which are suitably rotatably mounted on the Y-member 104 as for example by headed and shouldered rivets 108. The sheaves 106 have faces which are shaped to ride on the top and bottom sides of the double V-belt 86A –86B, and are positioned as shown with two sheaves 106 riding ok one face and the other sheave riding on the opposite face so as to lightly grip the belt between them.

The Y-member 104 is rigidly connected to a vertical shaft 110 mounted for sliding movement in a shelf support 11 suitably mounted on the frame. A coil compression spring 128 surrounds the shaft 110 and pushes against the shelf support 111 and the bottom of the Y-member 104 so as to maintain the double V-belt firmly seated in the groove of each V-pulley 32 so as to drive each pulley and its associated friction wheel 30 which will in turn drive the rollers 80 and 74 so as to move all articles on the rollers in the direction of arrow C when the belt is moving in the direction of Arrow D.

Each of the shelf supports 111 is attached to a member 118 which has an arm 114 pivotably connected to one end of it by pin 116. The arm 114 is also pivotally connected to the shaft 110 by a pin 112 and is rigidly connected to a vertical arm 120 which is rigidly fastened at its upper end to a yoke 122 which rotatably supports a rotatable element 124 which extends vertically slightly above the tops of the rollers 74 –80 so as to be moved downwardly when a package or other article passes over it.

The element 124 can be a single wheel, an alined series of wheels or a roller. When the series of wheels or roller is long, it is desirable to duplicate the arms 114 –120 on the opposite end of the member 118 and cross-connect the arms by suitable stiffeners so as to impart stability to the leverage system formed by the arms.

In the operation of the accumulation conveyor of the present invention, as long as no element 124 is depressed, an article on the conveyor will pass along moved by the rotating rollers 74 and 80 until it reaches the end of the conveyor. As the moving article passes over elements 124 it will depress them momentarily and thus move the V-belt 86A –86B out of the groove of the V-pulley 32 which is controlled by the element 124 momentarily depressed and stop rotation of the rollers 74 –80 just behind the article but these rollers will start to move again just as soon as the article moves off of the element 124 at that time depressed.

Whenever any article on the conveyor is stopped for any reason, such as reaching a stop at the end of the conveyor, it will usually be resting on and depressing an element 124 at that point. This will deactivate the rollers 74 –80 just behind the stopped article in the direction of article movement so that the next article will be stopped by the deactivated rollers when it reaches them and will not be forced into crushing contact with the first stopped article and this action will be continued all down the length of the conveyor as long as the stoppage of the first article continues.

When the first article is removed, the element 124 on which it was resting will rise under the action of the spring 128 which will cause the Y-shaped member to rise and reseat the V-belt in the V-pulley and start rotation of the rollers 74 –80 controlled by it which will start the stopped article on these rollers. The article so started will release a depressed element 124 which will start the article just behind it and this action will be repeated all down the line of articles on the conveyor.

It will be noted that there is a considerable leverage mechanical advantage between the point where the article depresses the element 124 and where the pin 112 causes the shaft 110 to lower and compress the spring 128 and also lower the Y-shaped member 104 so as to remove the V-belt 86A from the groove of V-pulley 32. This is possible because the accurate control of the movement and position of the belt 86A by the three rollers 106 due to the three point contact provided by the rollers makes it possible to move the belt only a very slight amount to either seat it firmly in the V-pulley groove or completely unseat it. The close position control of the three rollers on the V-belt eliminates the necessity to allow for variable slack or tension conditions of the V-belt by overmoving the belt as would be required if gravity alone were depended upon to lower the V-belt. This makes it possible to utilize a strong spring 128 so as to firmly seat the V-belt in the pulley 32 and still require only a slight weight on the element 124 to operate the belt release from the pulley.

This accurate control of the position of the V-belt 86A by each set of three rollers 106 also eliminates any cross effect of one set of rollers upon the set on each side of it as would be the case if gravity were depended upon to lower the V-belt 86A because the lowered area would extend well to each side of the exact point lowered by a single roller. This causes the stopping action of each control assembly made up of the elements extending between V-pulley 32 and depressible element 124, as well as the starting action, to be completely independent of any other such assembly. This enables the articles to be both stopped and started rapidly and without regard to the operation of any other assembly. The necessity for accurate adjustment of the tension of the V-belt is also eliminated by the three roll 106 arrangement because the operative position of the belt at either running or stopped position of the V-pulley 32 is not affected by tension. Also, the driving force exerted by the belt 86A is not affected by the tension of the belt because when the V-belt is firmly seated in the groove of V-pulley 32 by the spring 128 it drives with full force even through the belt may be relatively loose. This is, of course, not true where a flat belt is used.

The foregoing is to be considered as descriptive and not limitative because many physical changes can be made in the structure disclosed without departing from the spirit of the invention.

I claim:

1. An article conveyor comprising rotatable article supporting and moving elements, a power driven V-belt, a grooved V-pulley, means mounting said V-pulley in position to receive said V-belt in its groove so as to be rotated thereby, means for driving at least some of said rotatable article supporting and moving elements from said V-pulley, and means operated by contact of an article therewith at a selected point in its path of travel on said elements to disengage said V-belt from the groove of said V-pulley to thereby stop rotation of said V-pulley and the article supporting and moving elements driven thereby.

2. An article conveyor as specified in claim 1 further characterized in that the means for disengaging said V-belt from the groove of said V-pulley includes elements in contact with both the top and bottom of the V-belt in the vicinity of said V-pulley.

3. An article conveyor as specified in claim 1 further characterized in that the means for disengaging said V-belt from the groove of said V-pulley upon contact by an article therewith is further operative to reseat said V-belt in the groove of said V-pulley when the contact by an article is discontinued.

4. An article conveyor as specified in claim 3 further characterized in that the means for disengaging said V-belt from the groove of said V-pulley includes elements in contact with both the top and bottom of said V-belt in the vicinity of said V-pulley.

5. An article conveyor as specified in claim 4 in which said elements in contact with both the top and bottom of said V-belt are rollers.

6. An article conveyor as specified in claim 5 in which the rollers are placed at least one on the bottom of said V-belt substantially directly under the V-pulley and at least one on the top of said V-belt to each side of said V-pulley.

7. An article conveyor as specified in claim 6 in which the belt is a double V-belt.

8. An article conveyor as specified in claim 6 which further includes a spring-pressed means to urge the roller in contact with the bottom of said V-belt towards the V-pulley.

9. An article conveyor as specified in claim 6 in which all of said rollers are mounted to be moved together.

10. An article conveyor as specified in claim 9 in which the belt is a double V-belt.